United States Patent
Fogt

(10) Patent No.: US 12,219,196 B2
(45) Date of Patent: Feb. 4, 2025

(54) SYSTEMS AND METHODS FOR LOW-BANDWIDTH PRESENTATION DISTRIBUTION AND CONTROL

(71) Applicant: Harris-Stowe State University, St. Louis, MO (US)

(72) Inventor: James Fogt, St. Louis, MO (US)

( * ) Notice: Subject to any disclaimer, the term of this patent is extended or adjusted under 35 U.S.C. 154(b) by 0 days.

(21) Appl. No.: 17/968,409

(22) Filed: Oct. 18, 2022

(65) Prior Publication Data

US 2024/0129571 A1    Apr. 18, 2024

(51) Int. Cl.
*H04N 21/266* (2011.01)
*H04L 65/60* (2022.01)
*H04N 21/262* (2011.01)

(52) U.S. Cl.
CPC ....... *H04N 21/26613* (2013.01); *H04L 65/60* (2013.01); *H04N 21/262* (2013.01)

(58) Field of Classification Search
CPC . H04N 21/26613; H04N 21/262; H04L 65/60
See application file for complete search history.

(56) References Cited

U.S. PATENT DOCUMENTS

| | | | | |
|---|---|---|---|---|
| 6,728,753 | B1* | 4/2004 | Parasnis | H04L 67/1095 709/227 |
| 7,373,608 | B2* | 5/2008 | Lentz | H04N 7/15 348/E7.083 |
| 2005/0039133 | A1* | 2/2005 | Wells | G06Q 10/10 715/740 |
| 2006/0041687 | A1* | 2/2006 | Caspi | G06Q 10/10 709/248 |
| 2009/0063945 | A1* | 3/2009 | Bhogal | G06F 16/4393 715/203 |
| 2009/0106357 | A1* | 4/2009 | Igelman | H04L 69/28 709/203 |
| 2010/0169951 | A1* | 7/2010 | Vaughan | H04M 3/567 715/730 |
| 2010/0251122 | A1* | 9/2010 | Lee | H04M 1/72415 715/753 |
| 2012/0166952 | A1* | 6/2012 | Alexandrov | G06Q 10/101 715/730 |
| 2014/0325361 | A1* | 10/2014 | Lee | G06Q 10/10 715/730 |
| 2018/0352303 | A1* | 12/2018 | Siddique | H04L 65/1069 |

* cited by examiner

*Primary Examiner* — James R Sheleheda
(74) *Attorney, Agent, or Firm* — Armstrong Teasdale LLP

(57) ABSTRACT

A system providing remote content is provided. The system include a content server including at least one processor in communication with at least one memory device and a token server including at least one processor in communication with at least one memory device. The content server is programmed to a) store a plurality of content, each divided into a plurality of portions; b) receive a request from a client device for a first content of the plurality of content; and c) transmit the first content to the client device. The token server is programmed to: a) receive a request from the client device for an active token associated with the first content; b) retrieve the active token; and c) provide the active token to the client device, wherein the active token indicates an active portion of the plurality of portions of the first content.

19 Claims, 7 Drawing Sheets

SYSTEMS AND METHODS FOR LOW-BANDWIDTH PRESENTATION DISTRIBUTION AND CONTROL

BACKGROUND

The field of the invention relates generally to low-bandwidth presentation distribution and control, and more specifically, to remotely providing and controlling presentations with significantly reduced bandwidth needs The presentation of content live or in real-time over the Internet can be resource intensive. The live streaming of content can be bandwidth intensive due to the amount of data that is transmitted for the live content. The live streaming can also be processing intensive due to the receiving machines need to assemble the data before presenting the data to viewers, such as via a display. This can lead to quality issues when the bandwidth and/or processing resources reach saturation.

Streaming presentations are examples of inefficient bandwidth usage, especially when the visuals presented are content where the content does not change significantly. Especially, in environments where viewers have different set-ups and where some viewers have low bandwidth and/or processing resources available, a more efficient approach would be desirable.

BRIEF DESCRIPTION

In one aspect, a system providing remote content is provided. The system includes a content server including at least one processor in communication with at least one memory device. The system also includes a token server including at least one processor in communication with at least one memory device. The content server is programmed to store a plurality of content. Each divided into a plurality of portions. The content server is also programmed to receive a request from a client device for a first content of the plurality of content. The content server is further programmed to transmit the first content to the client device. The token server is programmed to receive a request from the client device for an active token associated with the first content. The token server is also programmed to retrieve the active token. In addition, the token server is programmed to provide the active token to the client device. The active token indicates an active portion of the plurality of portions of the first content. The system may include additional, less, or alternate functionality, including that discussed elsewhere herein.

In another aspect, a method for providing remote content is provided. The method is implemented by a content server including at least one processor in communication with at least one memory device and a token server including at least one processor in communication with at least one memory device. The method includes storing, by the content server, a plurality of content, each divided into a plurality of portions. The method also includes receiving, by the content server, a request from a client device for a first content of the plurality of content. The method further includes transmitting, by the content server, the first content to the client device. In addition, the method includes receiving, by the token server, a request from the client device for an active token associated with the first content. Moreover, the method includes retrieving, by the token server, the active token. Furthermore, the method includes providing, by the token server, the active token to the client device. The active token indicates an active portion of the plurality of portions of the first content. The system may include additional, less, or alternate functionality, including that discussed elsewhere herein.

In a further aspect, a non-transitory computer readable medium that includes computer executable instructions is provided. When executed by a computing device including at least one processor in communication with at least one memory device, the computer executable instructions cause the computing device to store, by a content server, a plurality of content, each divided into a plurality of portions. The instructions further cause the computing device to receive, by the content server, a request from a client device for a first content of the plurality of content. The instructions also cause the computing device to transmit, by the content server, the first content to the client device. In addition, the instructions cause the computing device to receive, by a token server, a request from the client device for an active token associated with the first content. Moreover, the instructions cause the computing device to retrieve, by the token server, the active token. Furthermore, the instructions cause the computing device to provide, by the token server, the active token to the client device. The active token indicates an active portion of the plurality of portions of the first content. The non-transitory computer readable medium may include additional, less, or alternate functionality, including that discussed elsewhere herein.

BRIEF DESCRIPTION OF THE DRAWINGS

Those of skill in the art will understand that the drawings, described below, are for illustrative purposes only. The drawings are not intended to limit the scope of the present teachings in any way.

Figure 1:
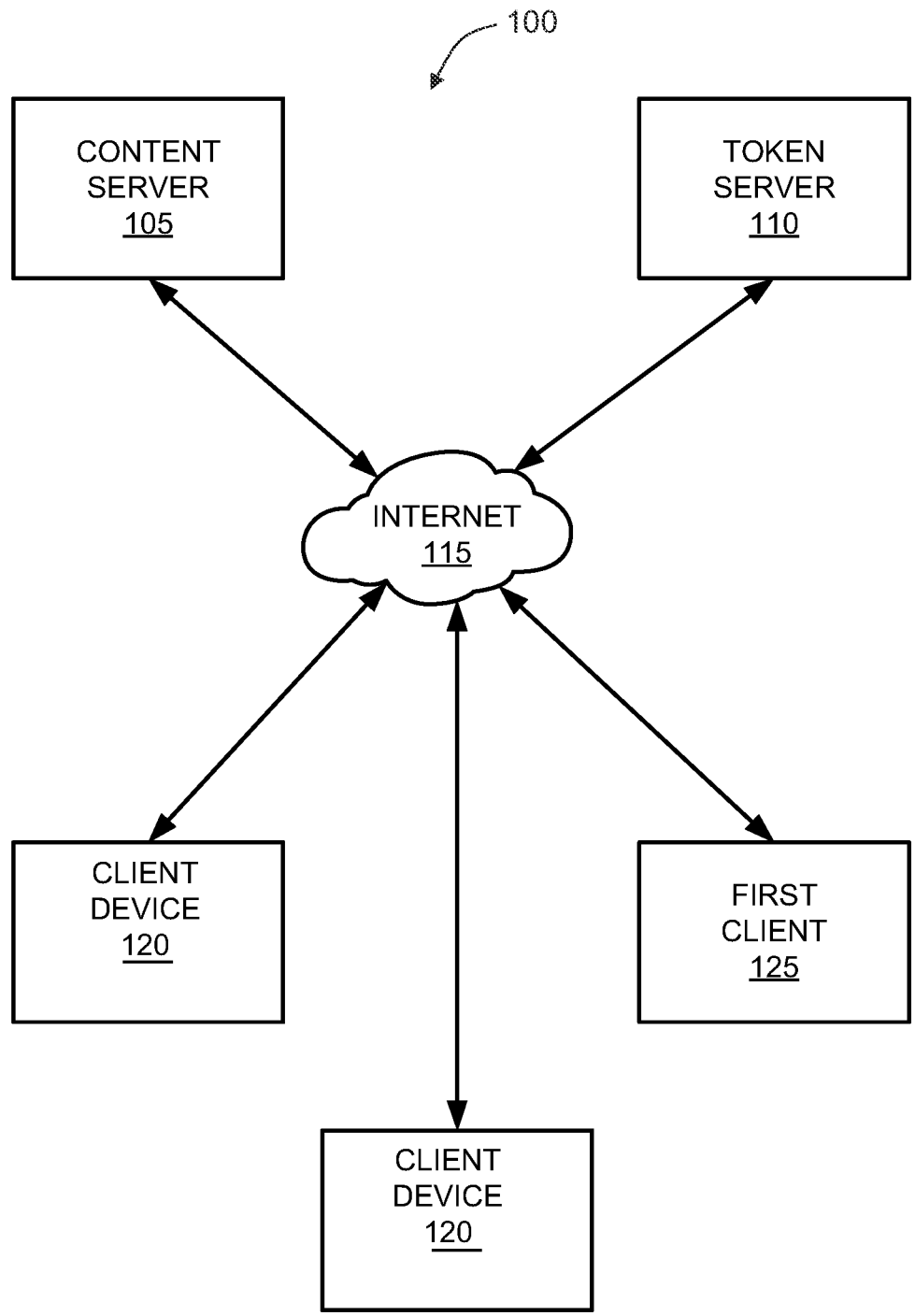
FIG. 1 illustrates a block diagram for low-bandwidth presentations in accordance with at least one embodiment.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

In various aspects, systems and methods of low-bandwidth streaming presentations are described herein. In some embodiments, these methods are performed by a content server and a token server in communication with a plurality of client devices. In other embodiments, the content server and the token server are combined.

Typical interactions with web content in a static HTML (hypertext markup language), JavaScript, and AJAX (Asynchronous JavaScript and XML (Extensible Markup Language)) user interfaces are initiated by end-user requests. As the end user selects content for viewing, the content is dynamically loaded locally or remotely through a variety of existing methods. Alternately, downloaded content may have a pre-written set of actions timed to execute at selected intervals or upon various conditions being met. However, there are instances where relying on the device operator and pre-programmed actions are unsuitable for controlling content being viewed on client devices. Such instances include remote presentations in which the presenter wishes to control how and when content can be viewed on client devices which have joined a presentation. In these cases, the remote presenter will often share a streaming visual representation of the presenter's screen. However, streaming presentations are bandwidth intensive and subject to quality issues when bandwidth reaches saturation. Streaming presentations are also inefficient uses of bandwidth when the visuals presented are content that can be easily rendered in HTML, CSS, or other common languages that can be interpreted by browsers. A more efficient approach in slide presentation example would be to have each end-user to create a local copy of the presenter's slides on the end-user's machine and subsequently give the remote presenter permission to control which slide is displayed for the audience members.

The method described herein illustrates how subsets of downloaded content on one or more client devices can be assigned unique reference tokens which correspond with a single, dynamic server-based token that is controlled by a remote operator (e.g. a presenter). Upon joining a presentation, client devices monitor one or more servers for token changes initiated by the presenter to synchronize content on both the presenter and client machine. Token control on the server is managed exclusively through the presenter(s) UI. In real-world applications, the method simulates high-fidelity, synchronous content streams while maintaining extremely low-bandwidth requirements to function in a near-synchronous state.

Web applications for end users typically use the client-server model: a server maintains a definitive source of content which can be requested on demand by a remote client. Content can be delivered as a whole document, as is the case with a static web page, or content can be delivered through a series of asynchronous interactions between the client device and a server. The end result is that subsets of downloaded content can be displayed or removed from the user interface after the content has been loaded on a client machine.

In at least one embodiment, the method describe herein leverages AJAX functionality, which is commonly used in modern web applications to enhance user experience by eliminating the appearance of static content reloading when dynamic content is called by JavaScript functions. Requests to add or remove content on AJAX-enabled web pages rely on pre-determined routines written and sequenced by developers or by the end-user making decisions which initiate events built into the web page. Accordingly, the client machine is controlled either by the end user or pre-programmed routines. These designs are asynchronous by nature, which makes them ill-suited for most collaborative environments and events.

In some system, creating synchronous interactions depends on content streams from one client machine to a larger audience of client machines. The most prevalent form of content streaming is an audio/video stream. However, there exists several tradeoffs with streaming models:
  A. Video streaming is resource intensive for networks, servers, and clients; therefore, video streams may lose fidelity as more clients consume a shared video stream over limited network resources.
  B. Clients using low-bandwidth environments may experience drastically inferior quality video or no video at all.
  C. Video streaming limits clients in their ability to directly interact with the content being streamed.
  D. Video streaming has minimal ability to provide the end users with a responsive format. Depending the end-user's device, the video stream may be limited to simple orientation changes from landscape to portrait modes on mobile devices.
  E. Video streaming may require specialized software and installation and maintenance routines to function at its best.
  F. Maintaining adequate streaming infrastructure is cost intensive and requires significant amounts of computer power and network resources.

The main advantage of video streaming is that the content creator can control what client machines are able to see and when they see it. To address the limitations of current content streaming technologies, the present system uses two necessary components:

First, a technology stack for creating original content and delivering that content via software that is native to most client devices. And second, s method for near-synchronous control of content on remote client computers.

In the exemplary embodiment, the first component could include web browsers, which are available on most modern smart devices. The web browsers can be access and controlled through a plurality of methods including the user HTML, JavaScript, AJAX, JSON and/or a plethora of open-source and commercial middleware solutions allow clients to interact with server data.

The second component is a method described herein which one client is able to control the timing and content on other client devices. In one embodiment, the method can be used with general-use applications in which a presenter controls the browser content displayed on client devices of audience members.

An example of such an application would be a slide-based presentation. In this example, each member of the audience and the presenter have a downloaded an exact copy of the presentation. The presentation is divided into content subsets (slides), each with a unique token assigned to it. As the presenter advances slides, the application writes (or updates as appropriate) a file on the server that contains the active token for the current presenter slide. Client computers poll the server for a secure file that contains the active token and then matches the token to the content subset assigned to the token. Upon matching the token to the content subset, client devices of audience members are automatically updated to match the presenter's selected slide.

In at least one embodiment, tokens are written to the server as simple text files or in a structured format such as JSON. A typical file that contains a token is measured in bytes (usually about 25 bytes or less). Thus, the speed at which tokens can be written and read is nearly instantaneous from the perspective of system end users.

FIG. 1 illustrates a block diagram of a system 100 for low-bandwidth presentations in accordance with at least one embodiment. In the exemplary embodiment, the system 100 includes a content server 105 and a token server 110. The content server 105 and token server 110 are in communication with a plurality of client devices 120 through the Internet 115. In the exemplary embodiment, one client device 120 acts as a first client 125 and is authorized to control the content being displayed on the client devices 120.

The content server 105 is configured to provide content to the client devices 120. In some embodiments, the content server 105 is in communication with one or more databases (not shown) that store one or more pieces of content. In the exemplary embodiment, the pieces of content are each divided up into portions, where the first client 125 controls which portion of the content to display on the client devices 120. For example, the pieces of content could be slideshow presentations and the portions are individual slides. In this example, the user of the first client 125 could be the presenter, such as a teacher, and the users of the client devices 120 could be viewers, such as students.

In the exemplary embodiment, the token server 110 is configured to include one or more token files that can be viewed by the client devices 120 and altered by the first client 125. In this embodiment, the token files include a token for the current presentation, where the token indicates which portion of the content to be displayed on the client devices 120. In some embodiments, the content may include a plurality of tokens, where the client device 120 matches the token in the token file with one of the plurality of tokens in the content. In other embodiments, the token includes an indicator for which portion of the content to have currently active, such as a page number or portion number. In some embodiments, the token file is encrypted and the client device 120 decrypts the token file to determine the active portion.

The token server 110 also updates the token file based on information from the first client 125. In at least one embodiment, the user of the first client 125 indicates to change the active portion of the content. Then the first client 125 informs the token server 110 of the update to the active portion. The token server 110 updates the token file with an indicator to the new active portion. In the exemplary embodiment, the token file is small, such as 25 bytes, so that the token server 110 quickly updates the token file. This effectively allows the first client 125 and the token server 110 to update the active portion in real-time.

In at least one embodiment, the client devices 120 receive a link to content for them to download and display. The client device 120 requests the content from the content server 105. The content server 105 provides the requested content. In some embodiments, the content server 105 validates the client device 120 to determine if the client device 120 is authorized to access the content. In other embodiments, the content may only be available during a specific time, such as when the presentation is being given. The content server 105 may determine whether or not to provide the information to the client device 120 based on a comparison of the current time and the time of the presentation. In some of these embodiments, the content server 105 may allow access to the information early to reduce strain on the content server 105 at the time of the presentation. For example, the content server 105 may allow client devices 120 to retrieve the content fifteen minutes before the presentation.

In at least one embodiment, the client devices 120 access the content server 105 via a browser, where the content server 105 provides the content to be displayed via the browser on the corresponding client devices 120.

In some embodiments, the client devices 120 periodically poll the token server 110 to determine which is the active token. In other embodiments, the active token is pushed from the token server 110 to the client devices 120 when the active token changes. In still further embodiments, the active token is pushed to the client device 120 periodically.

In some further embodiments, the client devices 120 may have registered for the presentation and the content server 105 knows the IP addresses for the registered client devices 120. In these embodiment, the content server 105 may transmit the content to the client devices 120 before the start of the presentation and may stagger the transmission to reduce bandwidth used and strain on the system 100.

While the present discussion describes teaching and presentations, one having skill in the art would understand that the present disclosure could apply to multiple situations where an individual user simultaneously controls the display of the devices of multiple other users. Examples of these situations can include, but are not limited to, a conductor controlling the sheet music shown to performers, subtitles being provided to audience members at a performance, teachers teaching remote students, remote meetings, sales pitches, seminars, and other situations.

Figure 2:
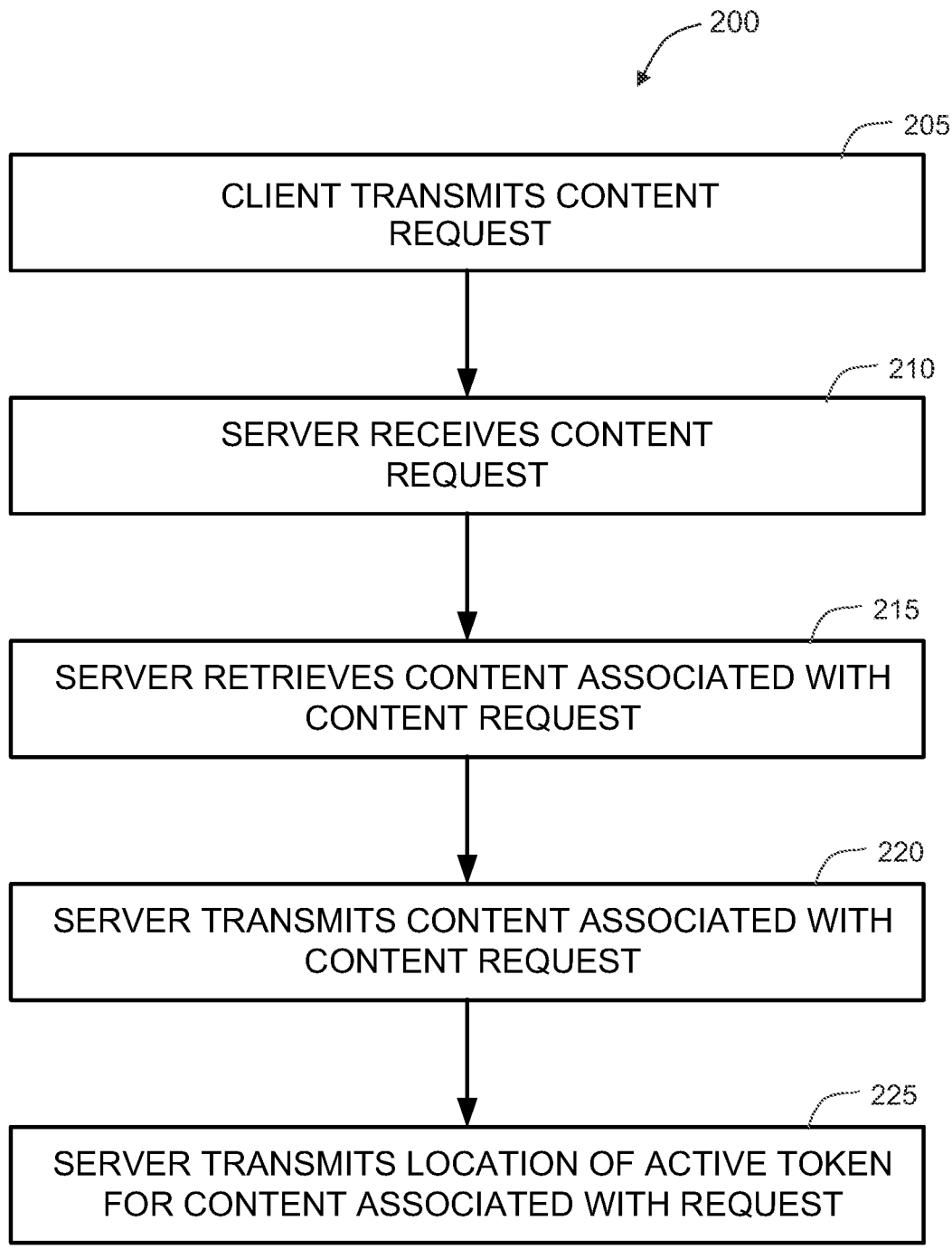
FIG. 2 illustrates a process for content distribution using the system shown in FIG. 1.

FIG. 2 illustrates a process 200 for content distribution using the system 100 (shown in FIG. 1). In the exemplary embodiment, the steps of process 200 are performed by the content server 105 and a client device 120 (both shown in FIG. 1).

In the exemplary embodiment, a client device 120 transmits 205 a content request to a content server 105. In some embodiments, the client device 120 is activating a hyperlink to the content on the content server 105. In other embodiments, the content request is a query from the client device 120. The content can include a presentation, such as a slide deck or any other content that works as described herein.

The content server 105 receives 210 the content request and retrieves 215 the content associated with the content request. In some embodiments, the content is stored in a content database associated with the content server 105. In some embodiment, the content server 105 validates the content request and/or the client device 120. To validate the content, the content server 105 can determine if the content is valid at this point in time. Since the content may be associated with a real-time presentation, the content may be accessible within a specific period of time before the presentation. The content may also be accessible during the presentation and for a specific period of time after the presentation. The client device 120 can be validated to determine if the client device 120 is authorized to access the content. In some embodiments, the client device 120 may transmit credentials with the content request or in response to a credentials query from the content server 105.

The content server 105 transmits 220 the content associated with the content request to the requesting client device 120. The content server 105 also transmits 225 a location for an active token for the content associated with the request. In some embodiments, the location for the active token is transmitted separately from the content. In other embodiments, the location for the active token is included in the content for the client device 120 to extract from the content. In some further embodiment, the content server 105 also transmits the current active token to the client device 120 to inform the client device 120 of which portion of the content to display on a display device of the client device 120.

Figure 3:
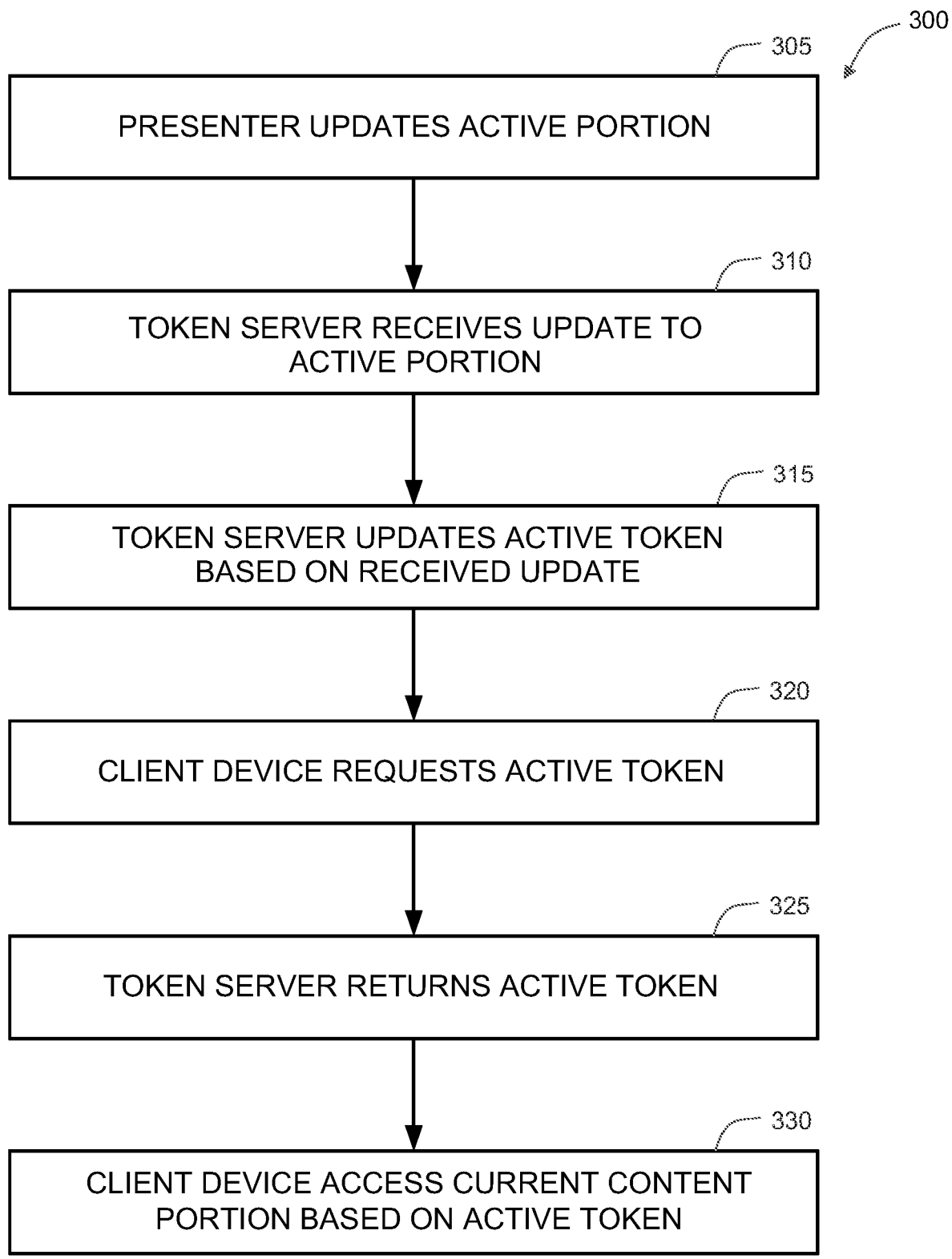
FIG. 3 illustrates a process for controlling content using the system shown in FIG. 1.

FIG. 3 illustrates a process 300 for controlling content using the system 100 (shown in FIG. 1). In the exemplary embodiment, the steps of process 300 are performed by the token server 110, a client device 120, and first client 125 (all shown in FIG. 1).

In the exemplary embodiment, the presenter, leader, or controller of the presentation is using first client 125. The controller, using the first client 125, updates 305 the active portion of the content. For example, the controller instructs the first client 125 to change the page or slide of the content being displayed. The token server 110 receives 310 the update to the active portion. The token server 110 determines which content the update is for and updates 315 the active token based on the update to the active portion. In the exemplary embodiment, the active token is stored in a token file, where the token file may only include 25 bytes. The token server 110 updates the active portion indicated by the active token for the corresponding content.

In the exemplary embodiment, a client device 120 (or a plurality of client devices 120) requests 320 the active token for the content that is currently active on the client device 120. The token server 325 returns the active token to the requesting client device 120. The client device 120 accesses 330 the current content portion based on the active token and displays that current content portion.

Figure 4A:
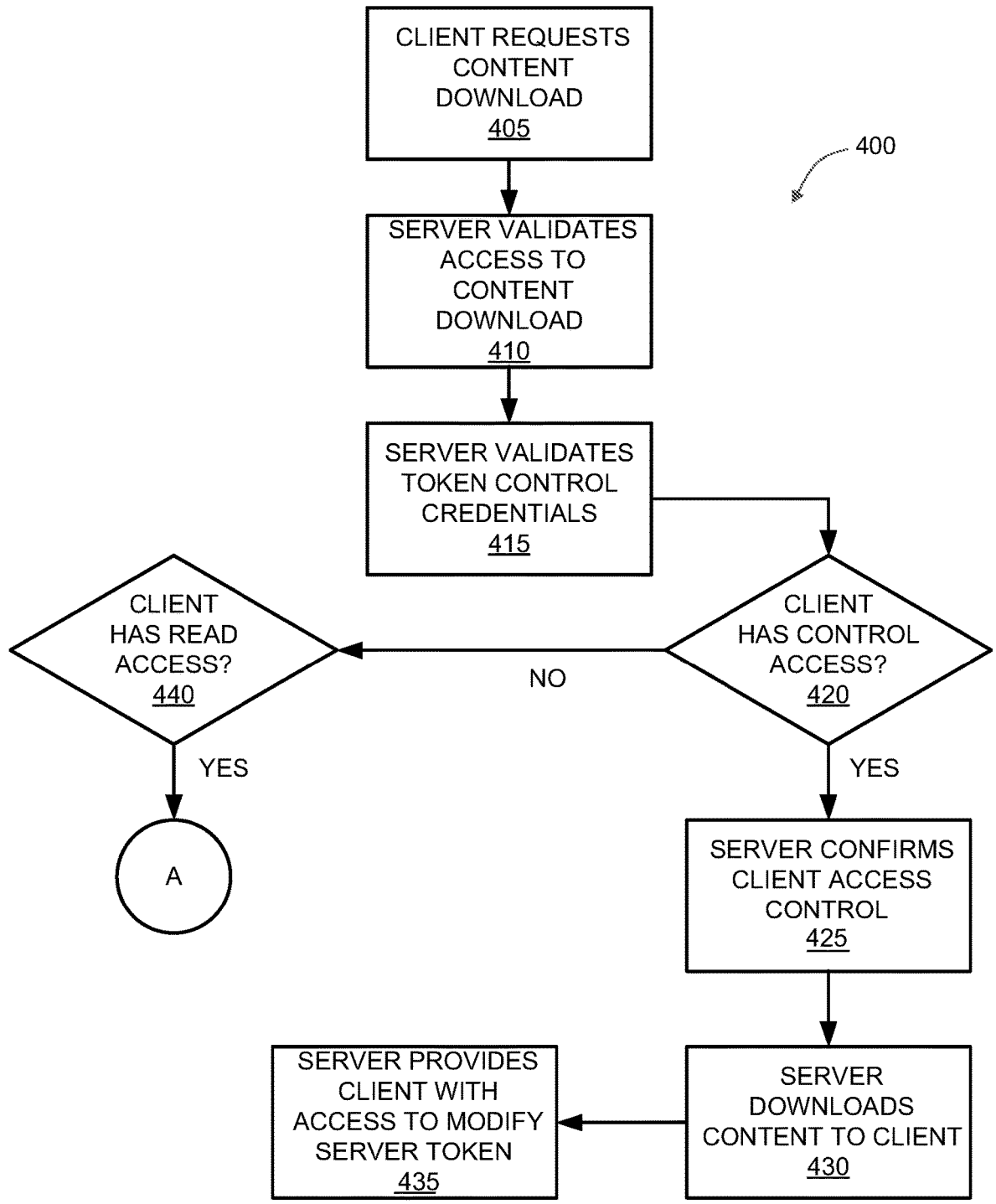
FIGS. 4A and 4B illustrate a process for connecting, controlling, distributing, and viewing content using the system shown in FIG. 1.
Figure 4:
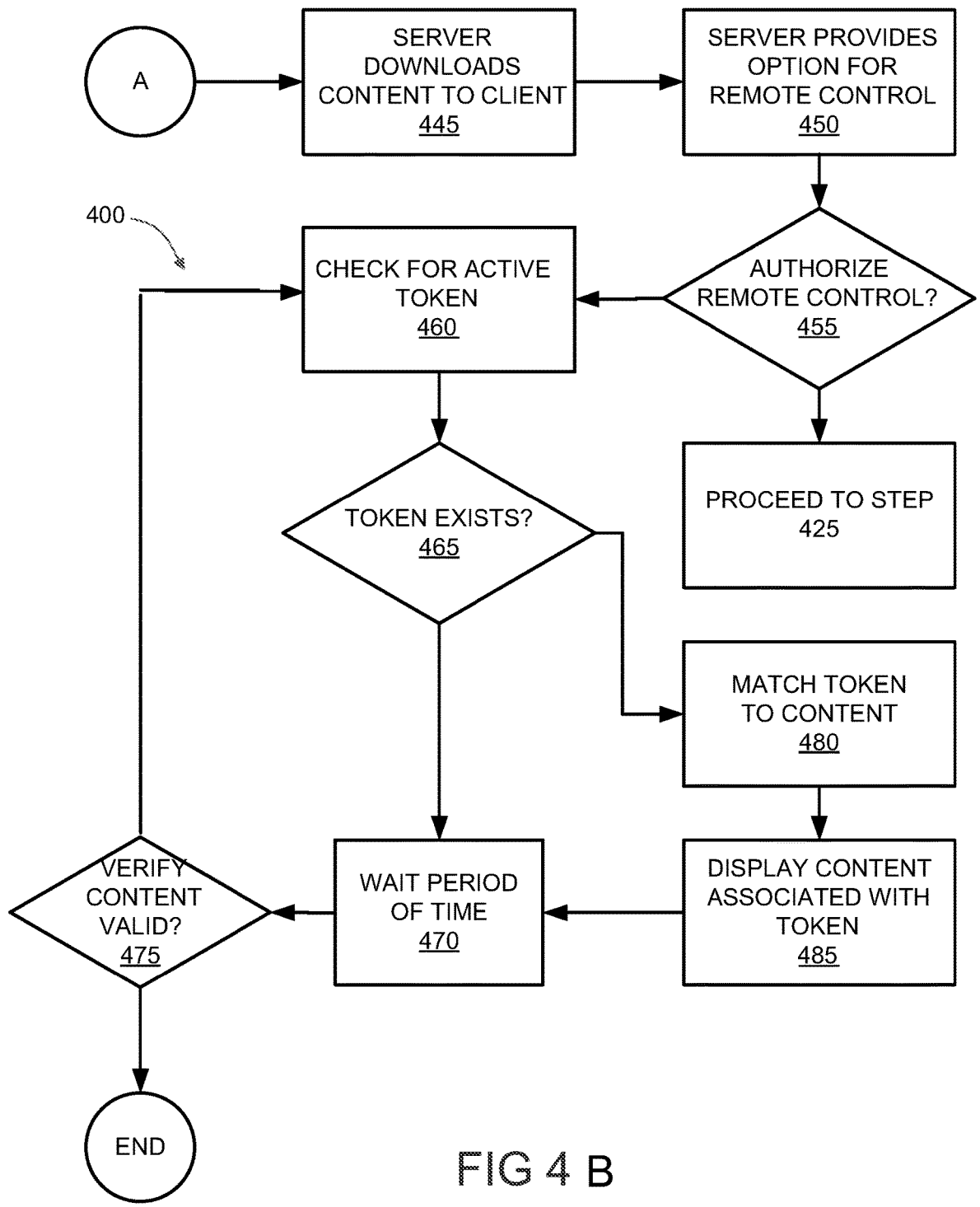

FIGS. 4A and 4B illustrate a process 400 for connecting, controlling, distributing, and viewing content using the system 100 (shown in FIG. 1). In the exemplary embodiment, the steps of process 400 are performed by the content server 105, the token server 110, a client device 120, and first client 125 (all shown in FIG. 1). Process 400 includes portions of process 200 (shown in FIG. 2) and process 300 (shown in FIG. 3).

In the exemplary embodiment, a client device 120 requests 405 a content download from the content server 105. The content server 105 validates 410 the client device's access to download the content. The content server 105 validates 415 the token control credentials for the user of the client device 120. In some embodiments, the token control credentials are transmitted from the client device 120 as a part of requesting 405 the content download. In other embodiments, the token control credentials are requested by the content server 105.

Based on the two validations 410 and 415, the content server 105 checks 420 if the client device 120 has control access. In other words, if the client device 120 is to be in control of the content and in control of which is to be the active portion of the content.

If the content server 105 confirms 425 that the client device 425 has access control, the content server 105 downloads 430 the content to the client device 120. Then the content server 105 and/or the token server 110 provides 435 the client device 120 with access to modify the active token for this content. The client device 120 is classified as the first client 125. In some embodiments, the token server 110 creates a new token file including at least one of an indicator of the active portion, an identifier of the content, and an identifier of the presenter/first client 125.

If the client device 120 does not have controller access, the content server 105 checks 440 if the client device 120 has read access. If the client device 120 does not have read access, then the content server 105 prevents the client device 120 from accessing the content. If the client device 120 has read access, then the content server 105 downloads 445 the content to the client device 120. After the content has downloaded, the content server 105 and/or token server 110 provides 450 an option for remote control by the client device 120. The content server 105 and/or token server 110 checks 455 to see if remote control by the client device 120 is authorized. If remote control by the client device 120 is authorized, the process 400 continues to Step 425. If remote control by the client device 120 is not authorized, then the client device 120 is a viewing device. The client device 120 checks 460 for active token for the content. In the exemplary embodiment, the client devices 120 requests the active token for the content from the token server 110. If the active token exists 465, the token server 110 returns the active token. The client device 120 receives the active token and matches 480 the active token to the content to determine the active portion associated with the token. The client device 120 displays 485 the active portion of the content. Next, the client device 120 waits 470 a predetermined period of time. In some embodiments, the predetermined period of wait time includes 500 to 3000 milliseconds and/or any other period of time to allow the system 100 to work as described. Then the client device 120 proceeds to Step 475 to check 475 if the content is still valid.

If the active token does not exist, the client device 120 waits 470 a predetermined period of time. In some embodiments, the predetermined period of wait time includes 500 to 3000 milliseconds and/or any other period of time to allow the system 100 to work as described. Then the client device 120 proceeds to Step 475 to check 475 if the content is still valid. If the content is still valid, the client device 120 proceeds back to Step 460 and the process 400 continues. If the content is no longer valid, such as the presentation being over, process 400 ends.

Figure 5:
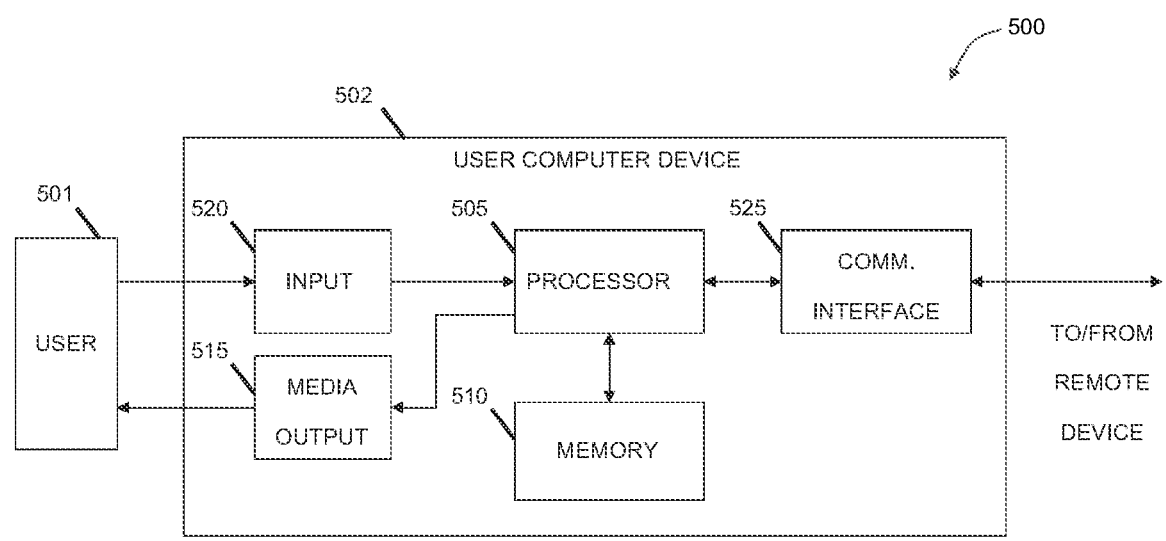
FIG. 5 illustrates an example configuration of a client system shown in FIG. 1, in accordance with one embodiment of the present disclosure.

FIG. 5 depicts an exemplary configuration of the computer devices shown in FIG. 1, in accordance with one embodiment of the present disclosure. User computer device 502 may be operated by a user 501. User computer device 502 may include, but is not limited to, content server 105, token server 110, client device 120, and first client 125 (all shown in FIG. 1). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, current content. In some embodiments, user computer device 502 may include an input device 520 for receiving input from user 501. User 501 may use input device 520 to, without limitation, select and/or enter a portion of content to be displayed.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as content server 105 and/or token server 110. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from content server 105. A client application allows user 501 to interact with, for example, token server 110. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instructions such as those illustrated in FIGS. 2-4B.

Figure 6:
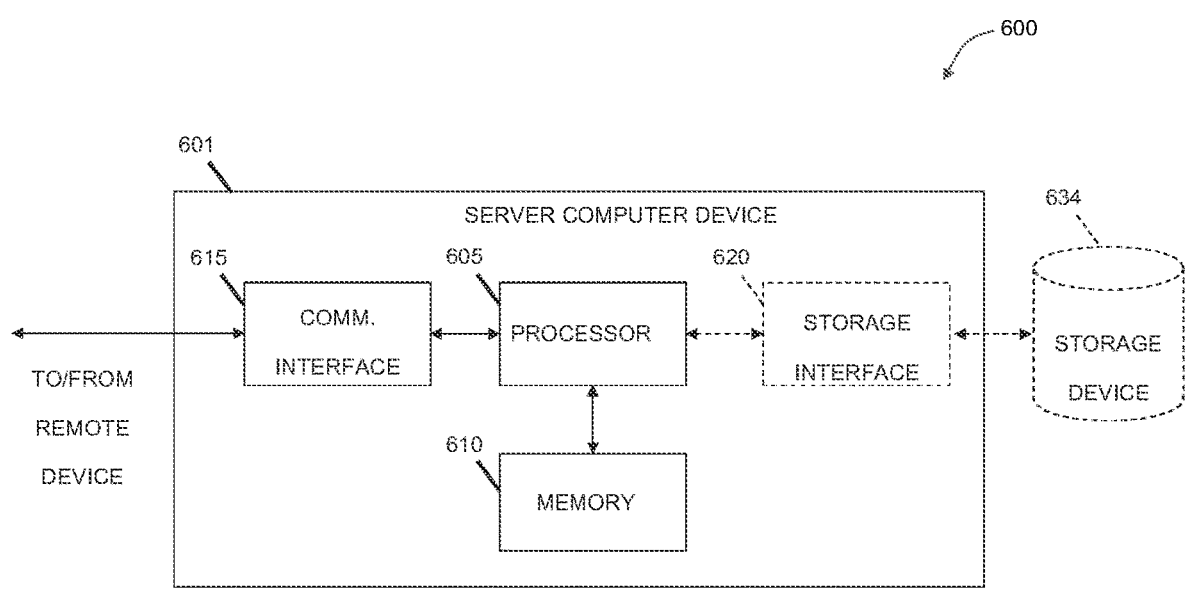
FIG. 6 illustrates an example configuration of a server system shown in FIG. 1, in accordance with one embodiment of the present disclosure.

FIG. 6 illustrates an example configuration of the server system shown in FIG. 1, in accordance with one embodiment of the present disclosure. Server computer device 601 may include, but is not limited to, content server 105 and token server 110 (both shown in FIG. 1). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601, client device 120, or first client 125 (both shown in FIG. 1). For example, communication interface 615 may receive requests from client devices 120 and first client 125 via the Internet 115, as illustrated in FIG. 1.

Processor 605 may also be operatively coupled to a storage device 634. Storage device 634 is any computer-operated hardware suitable for storing and/or retrieving data, such as, but not limited to, data associated with a database. In at least one embodiment, the database may be in communication with content server 105 and may be accessed by content server 105 to provide content to the client devices 120. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with instructions such as those illustrated in FIGS. 2-4B.

In the exemplary embodiment, the system 100 provides remote content. The system 100 includes a content server 105 including at least one processor 605 in communication with at least one memory device 610. The system 100 also includes a token server 110 comprising at least one processor 605 in communication with at least one memory device 610.

In the exemplary embodiment, the content server 105 is programmed to store a plurality of content, each divided into a plurality of portions. The content server 105 is also programmed to receive a request from a client device 120 for a first content of the plurality of content. The content server 105 is further programmed to transmit the first content to the client device.

The token server 110 is programmed to receive a request from the client device 120 for an active token associated with the first content. The token server 110 retrieves the active token. The token server 110 provides the active token to the client device 120. The active token indicates an active portion of the plurality of portions of the first content.

In some further embodiments, the content server 105 validates the client device 120 to confirm that the client device 120 is authorized to access the first content. The content server 105 validates that the first content is currently accessible. The content server 105 provides a location of the active token for the first content to the client device 120. In some embodiments, the location of the active token for the first content is in or attached to the first content.

In still further embodiments, the token server 110 receives an indicator of the active portion from a first client device 125. The token server 110 updates the active token based on the indicator of the active portion. The token server 110 validates a first client device 125 as a controller for the first content.

In some embodiments, the token server 110 receives the request for the active token associated with the first content from the client device 120 on a periodic basis. In other embodiments, the token server 110 broadcasts the active token to a plurality of client devices 120 with the first content.

In some of these embodiment, the active token is stored in a token file in the memory device of the token server.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on computer systems or mobile devices, or associated with or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine where treatments may migrate to within the body.

Based upon these analyses, the processing element may learn how to identify characteristics and patterns that may then be applied to analyzing image data, model data, and/or other data. For example, the processing element may learn, to identify trends of locations based on photon vectors and locations. The processing element may also learn how to identify trends that may not be readily apparent based upon collected data, such as trends that identifying optimal placement of treatments in the body relative to tumors.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

Exemplary embodiments of systems and methods for securely remotely controlling displays are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system providing remote content comprising:
a content server comprising at least one first processor in communication with at least one first memory device; and
a token server comprising at least one second processor in communication with at least one second memory device,
wherein the content server is programmed to:
store a plurality of content, each divided into a plurality of portions, wherein each portion of the plurality of portions is associated with a token of a plurality of tokens stored in the corresponding content;
receive a request from a viewing client device for a first content of the plurality of content; and
transmit the first content to the viewing client device, wherein the first content includes the plurality of tokens for the plurality of portions, and
wherein the token server is programmed to:
receive a request from the viewing client device for an active token associated with the first content;
retrieve the active token;
provide the active token to the viewing client device, wherein the active token indicates an active portion of the plurality of portions of the first content, wherein the viewing client device is configured to display the active portion associated with the active token;
receive an indicator of the active portion from a controlling client device controlling the active portion of the first content;
update the active token based on the indicator of the active portion;
receive a polling request for the active token from the viewing client device; and
respond to the polling request by providing the updated active token to the viewing client device, wherein the viewing client device is configured to display the active portion associated with the updated active token.

2. The system in accordance with claim 1, wherein the content server is further programmed to validate the viewing client device to confirm that the viewing client device is authorized to access the first content.

3. The system in accordance with claim 1, wherein the content server is further programmed to validate that the first content is currently accessible.

4. The system in accordance with claim 1, wherein the content server is further programmed to provide a location of the active token for the first content to the viewing client device.

5. The system in accordance with claim 4, wherein the location of the active token for the first content is in or attached to the first content.

6. The system in accordance with claim 1, wherein the token server is further programmed to validate the controlling client device as a controller for the first content.

7. The system in accordance with claim 1, wherein the active token is stored in a token file of 25 or less bytes in the at least one second memory device of the token server.

8. The system in accordance with claim 1, wherein the token server is further programmed to receive the request for the active token associated with the first content from the viewing client device on a periodic basis.

9. The system in accordance with claim 1, wherein the token server is further programmed to broadcast the active token to a plurality of viewing client devices including the viewing client device.

10. The system in accordance with claim 1, wherein the plurality of content includes a plurality of presentations and wherein the plurality of portions includes a plurality of slides, wherein the first portion of the plurality of portions includes an entire presentation, and wherein the active token indicates an active slide of the plurality of slides.

11. A method for providing remote content implemented by a content server comprising at least one first processor in communication with at least one first memory device and a token server comprising at least one second processor in communication with at least one second memory device, wherein the method comprises:
storing, by the content server, a plurality of content, each divided into a plurality of portions, wherein each portion of the plurality of portions is associated with a token of a plurality of tokens stored in the corresponding content;
receiving, by the content server, a request from a viewing client device for a first content of the plurality of content; and
transmitting, by the content server, the first content to the viewing client device, wherein the first content includes the plurality of tokens for the plurality of portions;
receiving, by the token server, a request from the viewing client device for an active token associated with the first content;
retrieving, by the token server, the active token;
providing, by the token server, the active token to the viewing client device, wherein the active token indicates an active portion of the plurality of portions of the first content, wherein the viewing client device is configured to display the active portion associated with the active token;
receiving an indicator of the active portion from a controlling client device controlling the active portion of the first content;
updating the active token based on the indicator of the active portion;
receiving a polling request for the active token from the viewing client device; and
responding to the polling request by providing the updated active token to the viewing client device, wherein the viewing client device is configured to display the active portion associated with the active token.

12. The method in accordance with claim 11 further comprising validating, by the content server, the viewing client device to confirm that the viewing client device is authorized to access the first content.

13. The method in accordance with claim 11 further comprising validating, by the content server, that the first content is currently accessible.

14. The method in accordance with claim 11 further comprising providing a location of the active token for the first content to the viewing client device.

15. The method in accordance with claim 14, wherein the location of the active token for the first content is in or attached to the first content.

16. The method in accordance with claim 11 further comprising validating, by the token server, the controlling client device as a controller for the first content.

17. The method in accordance with claim 11, wherein the active token is stored in a token file of 25 or less bytes in in the at least one second memory device of the token server.

18. The method in accordance with claim 11 further comprising receiving, by the token server, the request for the active token associated with the first content from the viewing client device on a periodic basis.

19. The method in accordance with claim 11, wherein the plurality of content includes a plurality of presentations and wherein the plurality of portions includes a plurality of slides, wherein the first portion of the plurality of portions includes an entire presentation, and wherein the active token indicates an active slide of the plurality of slides.

* * * * *